April 16, 1940. H. E. MUCHNIC 2,197,110
TRUCK
Filed May 26, 1936 2 Sheets-Sheet 1
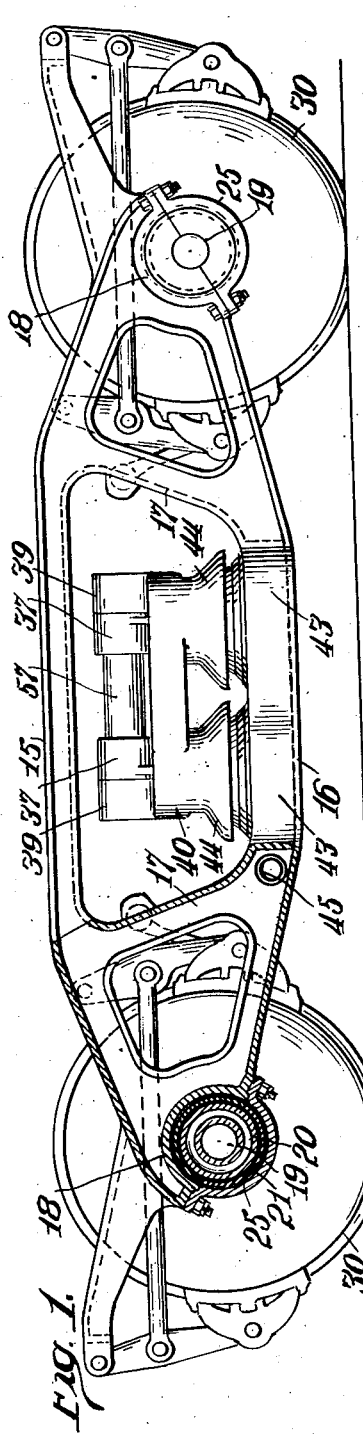
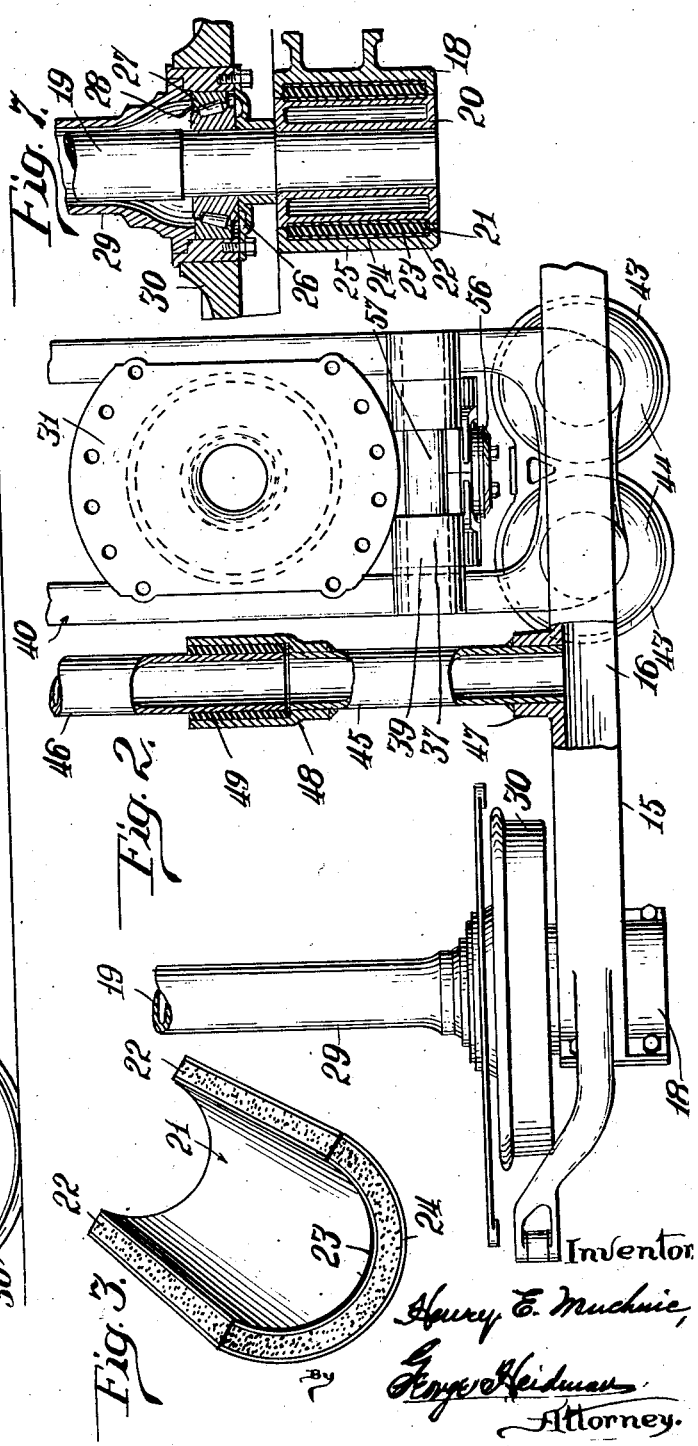

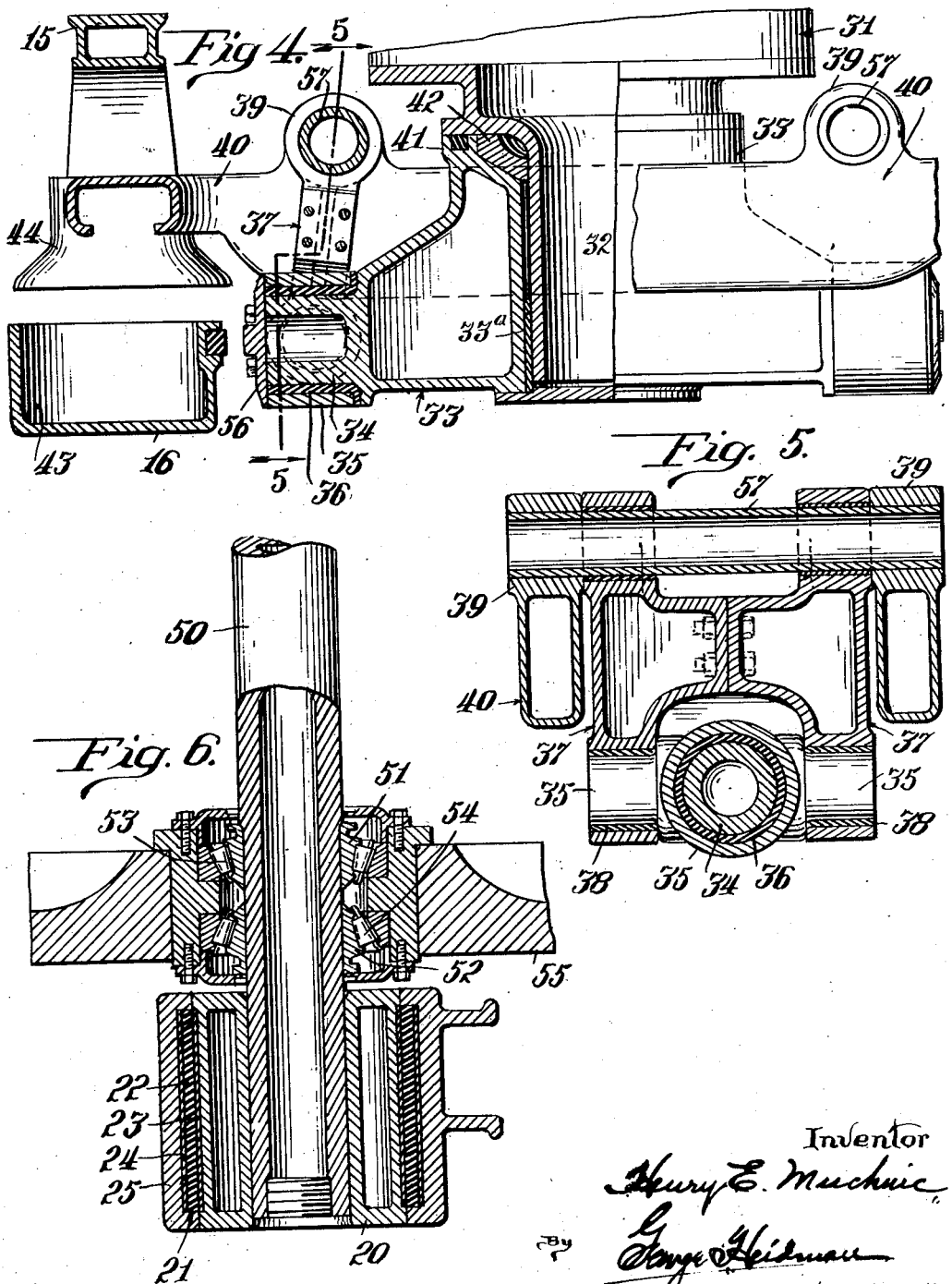

Patented Apr. 16, 1940

2,197,110

UNITED STATES PATENT OFFICE 2,197,110

TRUCK

Henry E. Muchnic, Atchison, Kans., assignor to The Locomotive Finished Material Company, Atchison, Kans., a corporation of Kansas Application May 26, 1936, Serial No. 81,876

8 Claims. (Cl. 105—190)

My invention relates to truck frames more especially intended for use on the trucks of a railroad passenger car and pertaining particularly to what is known as an A-type frame structure.

The invention has for its object the provision of a truck structure in which there is no unrestrained relative movement between the wheel assembly and the truck structure.

Another object of the invention is the provision of a truck frame contemplating a rigid axle together with means for clamping the axle to the frame through the intervention of resilient means adapted to absorb the vibrations and to restrain the non-rotary movements of the wheels.

The invention also has for its object the provision of a truck wherein the two side frames are united by certain spacer members which involve means whereby the relative movements of each truck frame are resisted by suitable resilient means which is also adapted to take up vibration and noise.

A further object of the invention is the provision of a truck having a transom supported by resilient means and provided with a link supported bolster adapted to have rotary motion in a vertical plane, while the transom member is so supported that it has freedom of motion in any direction in a horizontal plane.

Another object of my invention is the provision of a truck wherein the usual journal boxes are eliminated and the wheel assembly involves rigidly held axles.

The invention also involves the construction of a truck wherein the side frames are yieldingly tied together through the medium of the wheel assembly which is adapted to normally resist independent movement between the side frames.

A further object of the invention is the provision of a truck having side frames, composed of upper and lower members spaced apart to provide enlarged openings, a transom unit yieldingly supported at its ends on the side frames so as to be disposed adjacent said openings, a bolster depending within the transom unit, and link and trunnion mechanism for swingingly supporting the bolster from the transom unit.

The invention involves a truck side frame, composed of upper and lower members having axle receiving sockets, and non-rotatable axles clamped in said sockets so as to eliminate lateral play or motion between the side frames and the wheel assembly.

The various objects of my invention, as well as the advantages, will all be readily comprehended from the following detailed description of the drawings, wherein:

Figure 1 is a side elevation of my improved truck and frame with one end shown in section.

Figure 2 is a top plan of one side of the truck with portions shown in section and parts broken away.

Figure 3 is a detail view in perspective of a section of shock absorbing element between frame and axle.

Figure 4 is a sectional elevation of an intermediate and the bolster portion of the truck.

Figure 5 is a sectional view taken substantially on the line 5—5 of Figure 4, looking in the direction of the arrows.

Figure 6 is a longitudinal sectional view of a modified form of axle and wheel mounting.

Figure 7 is a detail sectional view of the axle mounting shown in Figure 1.

The specific embodiment of my invention preferably comprises a single piece cast frame of what is known as an A type consisting of the compression or top member 15, the tension or bottom member 16 and the struts 17, 17; the top and bottom members uniting at the ends in axle bearing receiving portions 18. The members or portions mentioned are all integrally united with each other, forming a single piece casting; and it will be understood that the truck frame at the opposite side of the truck is identical in construction.

The truck involves rigidly held axles 19, 19; the ends being each provided with a sleeve 20 (see Figure 7) immovably secured to the axles. These sleeves 20 in turn are surrounded by the shock or vibrating elements or resilient sleeves 21. The cushioning elements 21 preferably consist of two sections or halves, one of which is shown in perspective in Figure 3; each section or half comprising a semi-cylindrical vibration absorbing core portion, such as rubber 22 preferably provided with the inner and outer metallic shells 23, 24 to which the rubber is preferably vulcanized.

The sectional sleeves or vibration absorbing elements are clamped in place by the semi-cylindrical collar 25 which is bolted to the axle bearing portion 18 of the truck side frame as shown in Figure 1.

Providing the ends of the axles 19 with the sleeves 20 increases the circumference and consequently increases the circumferential areas of the vibration absorbing elements or rubber sleeves.

The axles 19, as previously stated, are rigidly held or clamped against rotation and therefore are provided with roller race-ways 26 for the roller bearings 27 which are held in place by the race-way 28 mounted within the ends of the tubular members or sleeves 29, on which the wheels 30 are rigidly secured; the wheels and sleeves 29 rotating together; the sleeves 29 extending to the wheels on the opposite side of the truck.

It is apparent that any lateral thrusts or side movements of the wheels will be restrained by the absorbing elements or sleeves wherein the cushioning portion or rubber 22 will be placed in shear and the shocks absorbed and not transmitted to the truck frame.

In the exemplification, the car body is supported by means of the kingpin member 31, the pin portion 32 whereof extends into a deep socket in the bolster 33 and is held against rocking movement by bushing 33ª.

The bolster 33 at opposite sides has laterally disposed bosses or trunnions 34 (see Figure 4) which receive the double trunnion forming yoke member 35, centrally apertured to slip onto the bosses or trunnions 34 of the bolster; the ends of the yoke member 35 being circular in cross-section.

Before sliding the yoke members 35 onto the bosses 34 of the bolster, the bosses 34 are preferably provided with bronze or other suitable bushings as shown at 36 in Figure 4.

The trunnion providing ends of the yoke members 35 receive the apertured ends of the lower section of the links 37; the trunnion forming ends of yoke member 35 being also preferably provided with bronze or other suitable bushings as at 38 before the links are slipped onto the ends of the yoke member 35.

As the yoke members 35 extend transversely of the bolster-bosses 34 it is apparent that a pair of links 37 are arranged on opposite sides of the bolster; and the upper sections or ends of the links 37 are oscillatingly suspended from suitable brackets as shown at 39 formed on the transom member 40 of the truck; the transom member being shown extending from side to side of the truck and consisting of a continuous member, as shown in Figure 2. The opposite ends of the transom 40 are yieldingly supported on the truck side frames by suitable shock absorbing resilient means, which, for example, may consist of a helical spring with a tit cap seat or suitable rubber cushion.

The top of the bolster 33 is provided with an annular grooved upstanding rib at 41, which holds a lubricant holding annular member or ring 42 in place concentric with the king pin receiving socket; the groove in the upstanding rib 41 being preferably provided with an annular felt gasket for the purpose of sealing the lubricant in the chamber formed by the annular member or ring 42—see Figure 4. The annular rib 41 also assists in preventing rocking movement of the king pin element on the bolster 33.

The bottom member 16 of the truck side frame at suitable points coincident with the ends of the transom 40 are formed to provide resilient means receiving pockets or nests as at 43; and the lower side of the transom 40 is preferably provided with enlarged inverted cup-like portions or caps 44 adapted to rest on the resilient means or springs arranged in the pockets or nests 43 of the truck frame.

The two side frames of the truck are tied together by flexible connections involving resilient or rubber collars so arranged that the stresses will place the rubber in shear.

These flexible connections in my improved truck frame consist of the spacer members 45, 46 which may be in the form of rods or tubes as shown in Figure 2, wherein member 45 is rigidly secured in a socket formed on the inside of lower frame member 16 as shown at 47; while the other end of the member 45 is provided with a sleeve portion 48 for the purpose of telescopically receiving the adjacent end of the spacer member 46 whose other end is rigidly secured to the truck frame at the opposite side of the truck in a manner similar to that shown at 47 in Figure 2. The sleeve portion 48 is provided with an inner diameter sufficiently large also to receive a vibration absorbing sleeve 49 disposed about the end of the spacer member 46.

The vibration or shock absorbing sleeve 49 preferably consists of a sectional cylinder as shown in Figure 3, consisting of the inner and outer metallic shells 23 and 24 with a comparatively thick core of rubber 22 vulcanized therebetween. The sleeve 49 is preferably made to fit snugly within the sleeve portion 48 and about the spacer member 46 and the end of the latter is normally held in slight spaced relation with the adjacent end of spacer member 45.

It is apparent that with this arrangement the relative movements of each truck frame will be resisted by the cushioning means or rubber sleeves arranged at the ends of the spacer members 45, 46 and also intermediate of the ends of the rigidly held axles and the ends of the truck frames.

In Figure 6 I illustrate a modification of the axle and wheel mounting. In this form the axle 50 is not surrounded by an outer tubular shell or sleeve; the axle 50 being rigidly clamped at its ends between what may be termed the solid ends 16 of the side frame and the semi-cylindrical collar 25, only a portion being shown in the longitudinal sectional view, Figure 6; the frame end and collar being of the same construction and secured together in the same way as shown in Figure 1.

As in the previously described construction, the end of the axle is provided with an enlargement or cylindrical sleeve rigidly secured to the axle and this enlargement or sleeve is surrounded by the sectional resilient shock absorbing sleeve 21, which is constructed as heretofore described and adapted to absorb the thrusts and vibrations as heretofore mentioned.

The axle is provided with a pair of roller race-ways 51, 52 adapted to receive the opposingly disposed rollers 53, 54, whereby the wheel 55 is rotatably mounted on the axle 50. With this construction it is apparent that the lateral thrusts in either direction will be transmitted to the adjacent end of the axle, thereby placing the rubber element in shear and hence causing these thrusts and vibrations to be absorbed by the cushioning element 21.

With my improved truck construction there will be no lateral or loose motion; the axles are rigidly held against rotation through the medium of shock absorbing elements; my invention providing a structure wherein the side frames at opposite sides of the truck are flexibly tied together by means of a twist and vibration absorbing medium; the bolster being suspended by means of links trunnioned on the transom which permit oscillatory movement through an arc of a vertically disposed circle about horizontal axes without direct vertical movement. The truck construction just recited also involves a transom that in turn is yieldingly supported by the side frames at opposite ends of the transom which permit the latter to have certain freedom of movement in any direction in a horizontal plane within prescribed limits.

The link and trunnion connections between the transom unit and the bolster are, of course, formed so as to maintain the swiveled mounting of the bolster, which, in the specific exemplification involves the cap-plates 56 which are bolted or otherwise secured to the outer ends of the bosses or trunnions 34 of the bolster after the bushings 36 and yoke members 35 have been inserted onto the trunnions 34. The links 37 may be pivotally secured to the brackets 39 of the transom in any suitable manner as for example by means of the rod or tube 57 disposed through the two brackets at the same end of the transom.

As is apparent from the foregoing description, I provide a truck wherein the frame has no lateral and no longitudinal movements independently of the running gear which involves firmly clamped axles whose clamping means taken in connection with a spacer element flexibly connect the side frames of the truck together by means of a vibration absorbing medium.

I have shown and described a specific embodiment of my invention which, however, may have expression in somewhat different form and I, therefore, do not wish to be understood as limiting myself to the exact construction disclosed, as modifications are possible and may be made without departing from the spirit of the invention.

What I claim is:

1. A truck of the character described comprising a single piece side frame at opposite sides of the truck; non-rotatable axles secured at the ends of the side frames; vibration absorbing means intermediate of the axles and the frames; a sectional spacer rod between the two side frames; and a resilient connection between the rod sections adapted to resist movement of one frame relative to the other.

2. A truck of the character described comprising side frames at opposite sides of the truck; axles non-rotatably secured to the side frames; spacer means secured to the side frames; cushion means intermediate of the axles and the side frames; and cushion means in said spacer means.

3. A truck of the character described comprising a pair of side frames; wheel carrying axles secured to the ends of the frames; means whereby the axles are non-rotatably clamped in place; an elongated rubber sleeve on said axles adapted to be placed in shear through movements transversely of the truck; spacer means secured to the side frames; and a rubber sleeve in said spacer means adapted to absorb the movements of either side frame transmitted through said spacer means.

4. A truck of the character described comprising side frames, each composed of a top and a bottom member uniting at their ends in axle receiving sockets; axles arranged at the ends of the frames with the axle-ends arranged in said sockets; vibration absorbing means in said sockets disposed about the axle-ends; semi-circular collars removably secured to the socketed ends of the frames and adapted to clamp said vibration absorbing means on the ends of the axle and prevent rotation of the latter; and tie means, between the frames at opposite sides of the truck, provided with a resilient and resistance offering portion.

5. A truck of the character described comprising side frames, each composed of a top and a bottom member having at the ends axle receiving portions; means whereby the axles are non-rotatably secured to the frames and a thrust absorbing connection provided; and tie means, between the frames at opposite sides of the truck, provided with a resilient and resistance offering element.

6. In a truck, side frames composed of top and bottom members united at the ends and having axle-receiving sockets; means for rigidly holding the axles in said sockets; a transom yieldingly supported on the bottom members of the side frames; a bolster; yoke members rotatably secured to the bolster; and links pivotally supported by the transom and pivotally secured to the ends of the yoke members so as to permit the bolster to rotate in a vertical plane lengthwise of the truck.

7. A truck of the character described comprising single piece side frames formed to constitute top members and bottom members united at their ends by semi-circular axle-receiving socket portions; axles disposed at the ends of said frames, the ends of the axles being provided with sleeves immovably secured thereto and the sleeved ends of the axles seated in the sockets at the ends of the frames; resilient vibration absorbing means disposed about the sleeves on the axles and composed of concentrically arranged metallic shells and a rubber core secured therebetween; and semi-cylindrical collars adapted to fit about said vibration absorbing means and be secured to the socketed ends of the frames so as to clamp the axles in place against rotation.

8. A truck of the character described comprising side frames provided with socketed ends; axles disposed transversely at the socketed ends of the frames; means, involving rubber sleeves adapted to fit about the ends of the axles, whereby the axles are non-rotatably secured in the socketed ends of the frames; and yielding tie members between the side frames at opposite sides of the truck.

HENRY E. MUCHNIC.